(12) United States Patent
Chung et al.

(10) Patent No.: US 8,775,711 B2
(45) Date of Patent: Jul. 8, 2014

(54) SOLID-STATE DISK, AND USER SYSTEM COMPRISING SAME

(75) Inventors: Eui-Young Chung, Seongnam-si (KR); Kwanhu Bang, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 3 days.

(21) Appl. No.: 13/581,126

(22) PCT Filed: Feb. 10, 2011

(86) PCT No.: PCT/KR2011/000902
§ 371 (c)(1),
(2), (4) Date: Nov. 13, 2012

(87) PCT Pub. No.: WO2011/105708
PCT Pub. Date: Sep. 1, 2011

(65) Prior Publication Data
US 2013/0073772 A1   Mar. 21, 2013

(30) Foreign Application Priority Data
Feb. 25, 2010 (KR) .................. 10-2010-0017109

(51) Int. Cl.
*G06F 13/36* (2006.01)
(52) U.S. Cl.
USPC ............................ 710/306; 710/308; 710/312

(58) Field of Classification Search
USPC .......................................... 710/308, 306, 312
See application file for complete search history.

(56) References Cited

U.S. PATENT DOCUMENTS

| 2008/0320214 | A1* | 12/2008 | Ma et al. ................... 711/103 |
| 2009/0150894 | A1  | 6/2009  | Huang et al. |
| 2009/0172261 | A1  | 7/2009  | Prins et al. |
| 2009/0235014 | A1  | 9/2009  | Yim et al. |
| 2009/0327377 | A1* | 12/2009 | Ylonen ...................... 707/206 |
| 2010/0205360 | A1* | 8/2010  | Harari et al. ............... 711/103 |

FOREIGN PATENT DOCUMENTS

KR    10-2009-0097671 A    9/2009

OTHER PUBLICATIONS

International Search Report PCT/ISA/210.

* cited by examiner

*Primary Examiner* — Nimesh G Patel
(74) *Attorney, Agent, or Firm* — Harness, Dickey & Pierce, P.L.C.

(57) ABSTRACT

The inventive concept relates to a user system including a solid state disk. The user system may include a main memory for storing data processed by a central processing unit; and a solid state disk for storing the selected data among data stored in the main memory. The main memory and the solid state disk form a single memory hierarchy. Thus, the user system of the inventive concept can rapidly process data.

10 Claims, 8 Drawing Sheets

SOLID-STATE DISK, AND USER SYSTEM COMPRISING SAME

TECHNICAL FIELD

The present inventive concept herein relates to user systems, and more particularly to a user system including a solid state disk.

BACKGROUND

Recently, a solid state disk (SSD) is widely being used as a data storage device in a user system. A solid state disk (SSD) uses a nonvolatile memory such as a flash memory as a storage device and has a better characteristic in the aspects of durability, size and power.

A solid state disk (SSD) is mainly used for replacing a conventional hard disk and is simply connected to a south bridge to be used just like a hard disk. However, in this case, a solid state disk has a disadvantage that it cannot support a data processing of high speed required by a user.

DETAILED DESCRIPTION OF INVENTION

Problem to be Solved

The purpose of the present invention is to provide a user system including solid state disk with high speed data processing.

The purpose of the present invention is to provide a data processing device including a solid state disk with high speed data processing and method thereof.

Means for Solving Problem

Embodiments of the inventive concept provide a user system. The user system may include a main memory for storing data processed by a central processing unit; and a solid state disk for storing the selected data among data stored in the main memory. The main memory and the solid state disk form a single memory hierarchy.

In some embodiments, the main memory is connected to the solid state disk, thereby forming a direct data transmission path therebetween.

In some embodiments, the user system may further include a north bridge connected to the main memory; and a south bridge connected to the north bridge and the solid state disk. The direct data transmission path between the main memory and the solid state disk does not pass through the north bridge and the south bridge.

In some embodiments, the solid state disk may further include a DMA (direct memory access) device for supporting a data transmission between the main memory and the solid state disk through the direct data transmission path.

In some embodiments, the user system further includes a first DMA (direct memory access) device for supporting a data transmission between the main memory and the solid state disk through the direct data transmission path; and a second DMA (direct memory access) device for supporting a data transmission between the main memory and the solid state disk via the north bridge. The first DMA (direct memory access device) is in the solid state disk and the second DMA (direct memory access device) is in the south bridge.

In some embodiments, the main memory and the solid state disk are connected to the north bridge.

In some embodiments, the direct data transmission path between the main memory and the solid state disk does not pass through the north bridge.

In some embodiments, the user system may further include a first DMA (direct memory access) device for supporting a data transmission between the main memory and the solid state disk through the direct data transmission path; and a second DMA (direct memory access) device for supporting a data transmission between the main memory and the solid state disk via the north bridge. The first DMA (direct memory access device) is in the solid state disk and the second DMA (direct memory access device) is in the south bridge.

Embodiments of the inventive concept also provide a solid state disk. The solid state disk may include a nonvolatile memory area for storing data; a volatile memory area for temporarily storing selected data among data stored in the nonvolatile memory area; and a direct memory access device for supporting a direct data transmission between the data stored in the volatile memory area or the nonvolatile memory area and a main memory of user system.

In some embodiments, the solid state disk further includes a main memory interface for communicating with the main memory of the user system, wherein a direct data transmission path is formed between the main memory of the user system and the main memory interface. The main memory of the user system is used as a cache buffer for temporarily storing data stored in the nonvolatile memory area.

In some embodiments, the solid state disk may further include a main memory controller for controlling the main memory of the user system.

In some embodiments, the nonvolatile memory area comprises at least one of a flash memory, a PRAM, a FRAM and a RRAM.

Embodiments of the inventive concept also provide a user system. The user system may include a first memory area storing data processed by a control of a central processing unit; a second memory area storing selected data among data stored in the first memory area, the second memory area being a nonvolatile memory; and a bridge area connected to the first and second memory areas to form a data transmission path. The first and second memory areas form a single memory hierarchy.

In some embodiments, a direct data transmission path is formed between the first memory area and the second memory area.

In some embodiments, the bridge area may include a first bridge connected to the first memory area to form a data transmission path; and a second bridge connected to the first bridge and the second memory area to form a data transmission path, wherein the direct data transmission path does not pass through the first and second bridges.

In some embodiments, the second memory area may include a first DMA (direct memory access) device for supporting a data transmission between the first memory area and the second memory area through the direct transmission path and the second bridge comprises a second DMA (direct memory access) device for supporting a data transmission between the first memory area and the second memory area through a data transmission path via the first and second bridges.

In some embodiments, bridge area is connected to the first memory area and the second memory area, and the first memory area and the second memory area communicate with the bridge area using the same interface.

In some embodiments, the second memory area may further include a first direct memory access device for supporting a data transmission between the first memory area and the second memory area through the direct transmission path, and the bridge area comprises a second direct memory access device for supporting a data transmission between the first memory area and the second memory area through a data transmission path via the bridge area.

Embodiments of the inventive concept also provide a data processing unit. The data processing unit may include a main memory for storing data processed by a central processing unit; and a solid state disk for storing selected data among data stored in the main memory. The solid state disk and the main memory directly exchange data with each other.

In some embodiments, the solid state disk comprises: a nonvolatile memory area for storing data; a volatile memory area for temporarily storing selected data among data stored in the nonvolatile memory area; and a DMA (direct memory access) device for supporting a direct exchange of data with the main memory.

In some embodiments, the solid state disk may further include a main memory interface for communicating with the main memory and wherein a direct data transmission path is formed between the main memory and the main memory interface.

In some embodiments, the main memory can be used as a cache buffer for temporarily storing data stored in the solid state disk.

In some embodiments, the solid state disk is connected to the main memory interface, and the data processing unit may further include a main memory controller for controlling the main memory.

Effect of the Invention

According to the inventive concept of the present invention, the user system including a solid state disk can provide a high speed data processing.

DETAILED DESCRIPTION OF THE EMBODIMENTS

Embodiments of inventive concepts will be described more fully hereinafter with reference to the accompanying drawings, in which embodiments of the invention are shown.

Figure 1:
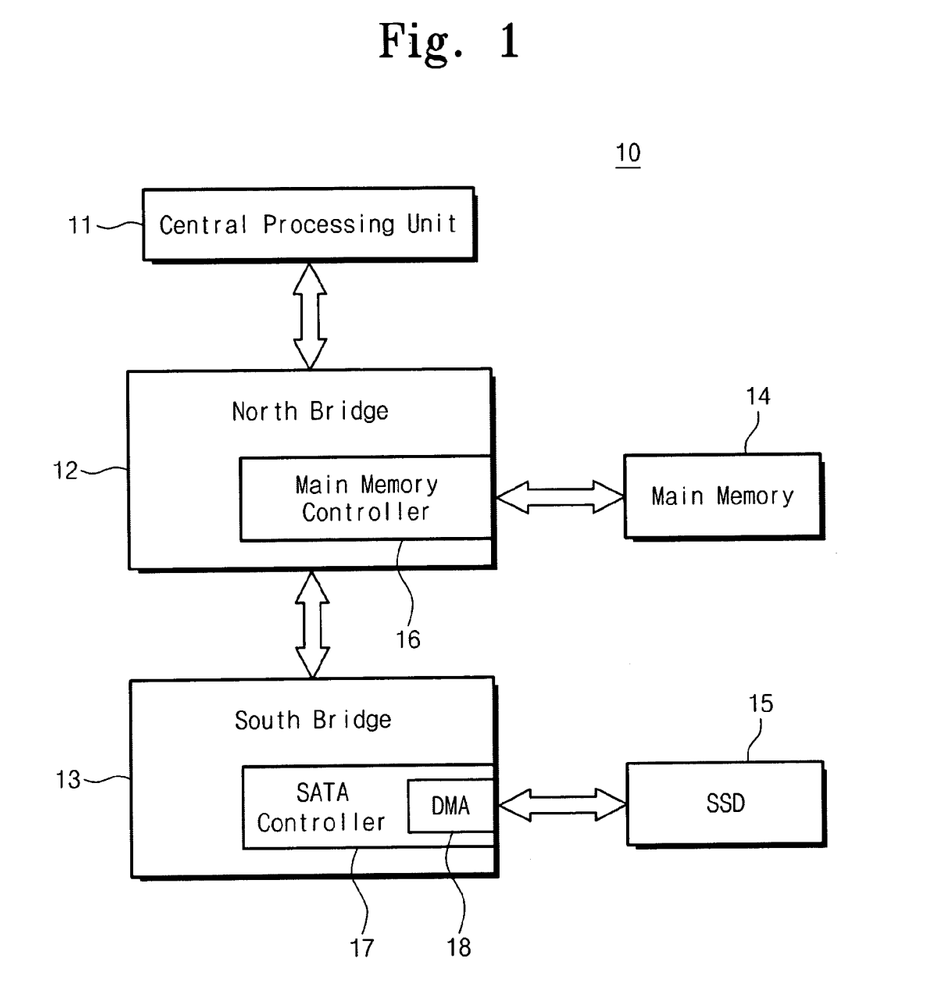
FIG. 1 is a block diagram illustrating a user system in accordance with some embodiments of the inventive concept.

FIG. 1 is a block diagram illustrating a user system in accordance with some embodiments of the inventive concept. In FIG. 1, as an example of the user system 10, a personal computing (PC) system is illustrated. This is only an illustration and the user system 10 may include various electronic devices such as a notebook, a tablet PC, a portable terminal, etc.

Referring to FIG. 1, the user system 10 includes a central processing unit (CPU) 11, a north bridge 12, a south bridge 13, a main memory 14 and a solid state disk (SSD) 15.

The north bridge 12 is connected to a peripheral device having a comparatively high speed to perform a bridge role so that the CPU 11 accesses to a peripheral device with a high speed.

For example, the north bridge 12 is connected to the main memory 14 so that the CPU 11 accesses the main memory 14. In this case, the north bridge 12 includes a main memory controller 16 for controlling the main memory 14.

A comparatively low speed peripheral device is connected to the south bridge 13. A SSD 15 having a low speed as compared with the main memory 14 is connected to the south bridge 13. In this case, the south bridge 13 includes a SATA controller 17 and a direct memory access (DMA) 18. The DMA 18 supports a data transmission between peripheral devices and the SSD 15. For example, the DMA 18 stores data stored in the main memory 14 into the SSD 15 via the north bridge 12 and the south bridge 13. Also, the DMA 18 transmits data stored in the SSD 15 to the main memory 14 via the north bridge 12 and the south bridge 13.

The main memory 14 is constituted by mainly volatile memories. Volatile memories may lose their stored data when their power supplies are interrupted. Examples of the volatile memories are a DRAM, a SRAM, etc. The volatile memories have the advantage of high data processing speed as compared with nonvolatile memories.

The SSD 15 includes nonvolatile memories for storing data and volatile memories for temporarily storing data. The nonvolatile memories can retain their stored data even when their power supplies are interrupted. Examples of the nonvolatile memory include an EEPROM, a FRAM, a PRAM, a MRAM, and a flash memory. A flash memory is mainly used as a nonvolatile memory of the SSD 15. The nonvolatile memories have a disadvantage of low data processing speed as compared with the volatile memories.

To make up for that disadvantage, the SSD 15 includes a cache buffer. The cache buffer temporarily stores data to be stored in a nonvolatile memory. The cache memory is a volatile memory and includes a DRAM, a SRAM, etc. The cache buffer temporarily stores data frequently used among the data stored in the nonvolatile memory of the SSD 15.

In the user system of FIG. 1, because of the nature of system, a data transmission frequently occurs between the main memory 14 and the SSD 15. In this case, a data transmission time between the main memory 14 and the SSD 15 may function as a factor determining sensory performance of the system. To improve performance of the system, it is necessary to shorten a data transmission time between the main memory 14 and the SSD 15.

Figure 2:
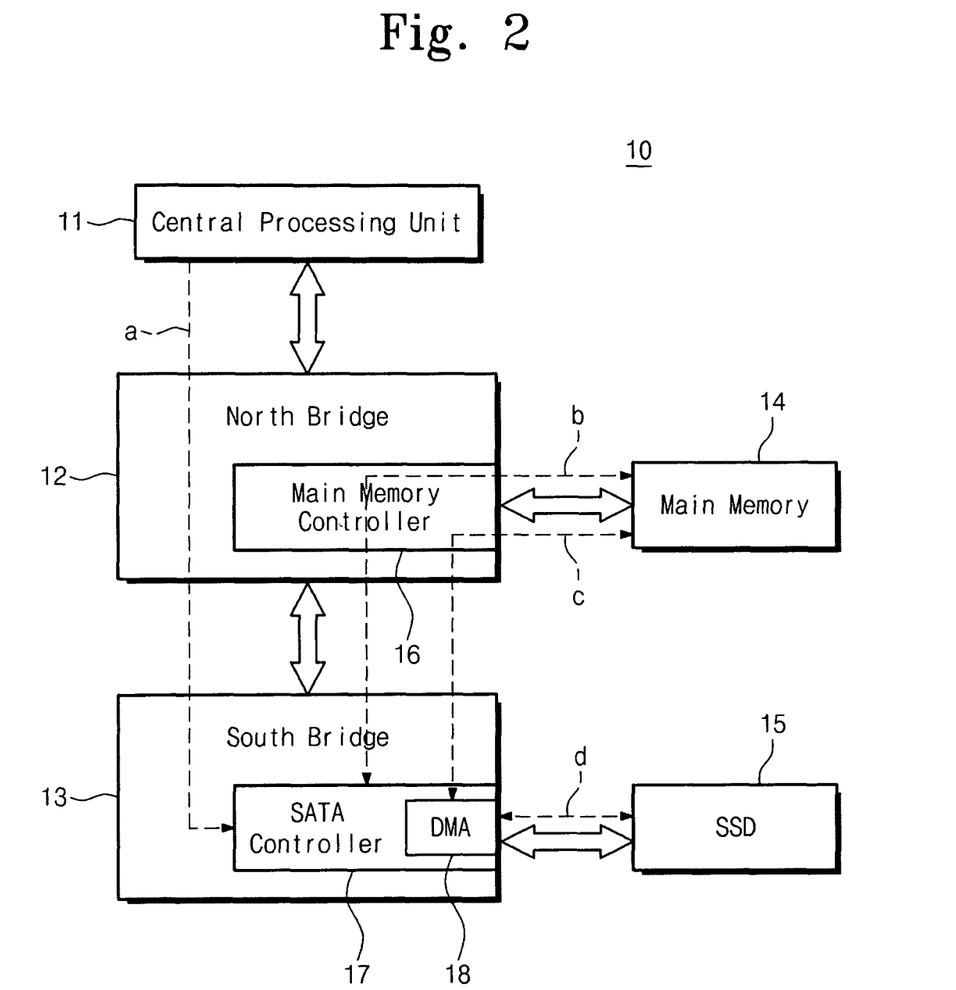
FIG. 2 is a block diagram for explaining a data transmission between a main memory and a SSD in the user system of FIG. 1.

FIG. 2 is a block diagram for explaining a data transmission between a main memory and a SSD in the user system of FIG. 1. In FIG. 2, for a brief description, it is assumed that data stored in the main memory 14 is stored in the SSD 15.

In this case, the CPU 11 transmits a write signal to the SATA controller 13 of the south bridge 13 (a). The SATA controller 13 receives information on address, size, etc. of write requested data from the main memory 14 in response to the received write signal (b). The DMA 18 reads out the write requested data from the main memory 14 on the basis of the information received to the SATA controller 13 (c). The DRAM 18 transmits the data read out from the main memory 14 to the SSD 15 (d) and the SSD 15 stores the received data in an internal nonvolatile memory.

The SSD 15 can sequentially store the received data in the internal cache buffer and can store data accumulated in the cache buffer in the internal nonvolatile memory. The SSD 15 can directly store the received data in the internal nonvolatile memory via the internal cache buffer. This can vary depending on a data storage policy of the SSD 15.

As described above, a data transmission in the user system of FIG. 1 is performed via the north bridge 12 and/or the south bridge 13. A data transmission path in the user system of FIG. 1 includes the main memory 14 and the cache buffer of the SSD 15. To improve a data transmission speed of the user system of FIG. 1, the user system is described in detail according to some other embodiments of the inventive concept.

Figure 3:
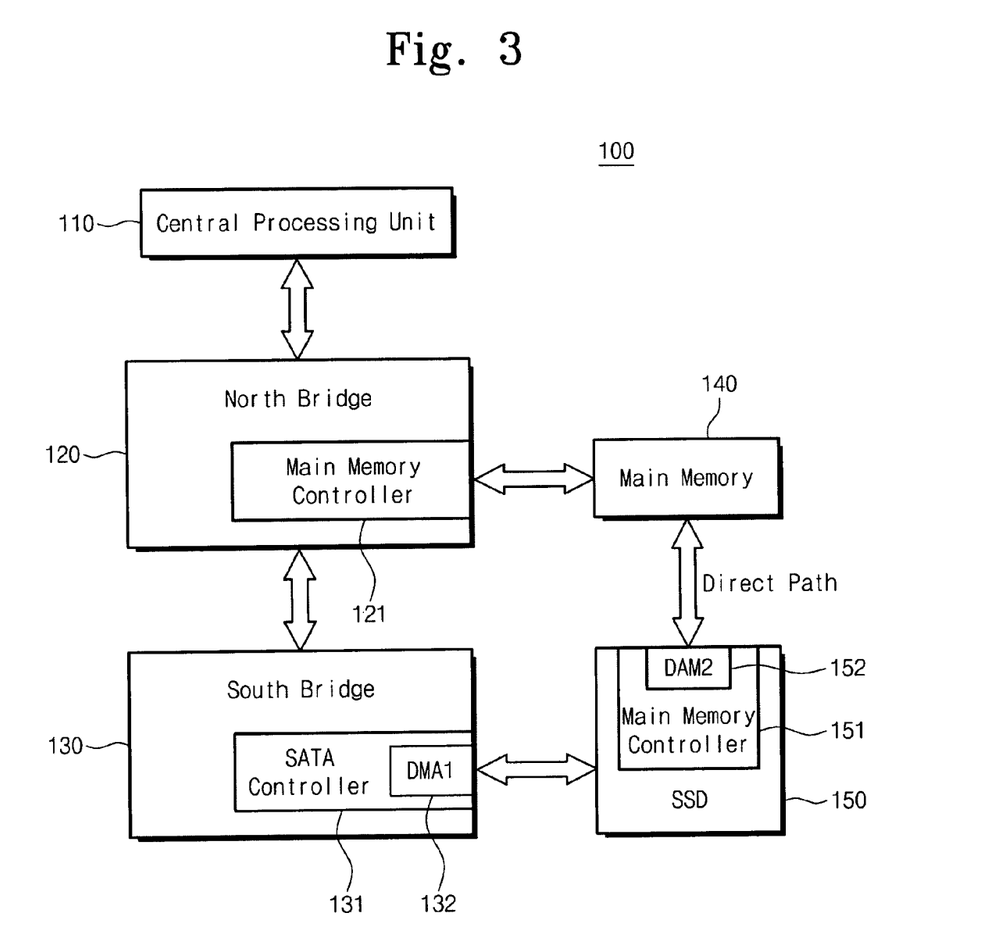
FIG. 3 is a block diagram illustrating a user system in accordance with some other embodiments of the inventive concept.

FIG. 3 is a block diagram illustrating a user system in accordance with some other embodiments of the inventive concept. In FIG. 3, as an example of the user system 100, a PC system is illustrated. The user system of FIG. 3 is similar to the user system of FIG. 1. Differences between the user systems of FIGS. 1 and 3 will be described in priority below.

Referring to FIG. 3, the user system 100 includes a central processing unit 110, a north bridge 120, a south bridge 130, a main memory 140 and a SSD 150. The north bridge 120 is connected to the main memory 140 and performs a bridge role so that the central processing unit 110 accesses to the main memory 140. In this case, the north bridge 120 includes a main memory controller 121 for controlling the main memory 140. The south bridge 130 is connected between the north bridge 120 and the SSD 150 and includes a SATA controller 131 and a first DMA 132. The first DMA 132 supports a data transmission between the main memory 140 and the SSD 150. Since the north bridge 120 and the south bridge 130 are similar to those of FIG. 1, a detailed description thereof is omitted.

The SSD 150 is connected to the south bridge 130 and the main memory 140. The SSD 150 is connected to the south bridge 130 to form a data transmission path and is connected to the main memory 140 to form a data transmission path. Unlike the SSD 15 of FIG. 1, the SSD 150 of FIG. 3 has a direct path to the main memory 140. A data transmission path may be formed between a volatile memory of the SSD 150 and the main memory 140. In this case, the SSD 150 may include a main memory interface for directly exchanging data with the main memory 140.

In this case, a data transmission can be directly performed between the SSD 150 and the main memory 140 through a direct path. The SSD 150 includes a main memory controller 151 for controlling the main memory 140 and a second DMA 152 for supporting a data transmission through the direct path.

Unlike the SSD 15 of FIG. 1, in the SSD 150 of FIG. 3, a data transmission may be directly performed between the main memory 140 and the SSD 150. Since a direct data transmission between the main memory 140 and the SSD 150 is performed without passing through the north bridge 120 and/or the south bridge 130, the user system of FIG. 3 can be performed faster than the user system of FIG. 1.

In the user system of FIG. 3, a data transmission between the main memory 140 and the SSD 150 can be further performed via the north bridge 120 and the south bridge 130 like the user system of FIG. 1. In the user system of FIG. 3, a data transmission between the main memory 140 and the SSD 150 can be performed through a direct path or via the north bridge 120 and/or the south bridge 130. This means that the user system of FIG. 3 can support a multi tasking operation.

Figure 4:
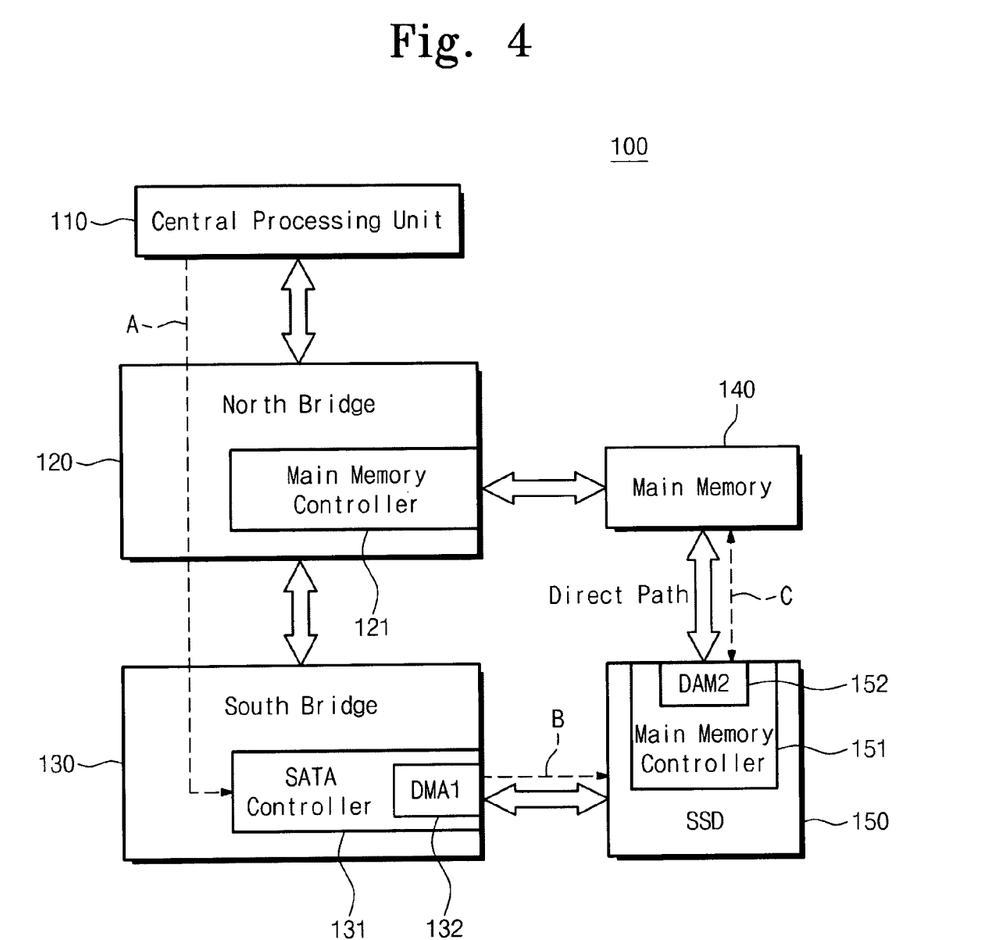
FIG. 4 is a block diagram for explaining a data transmission between a main memory and a SSD in the user system of FIG. 3.

FIG. 4 is a block diagram for explaining a data transmission between a main memory and a SSD in the user system of FIG. 3. Just like the user system of FIG. 1, the user system of FIG. 3 can perform a data transmission via the north bridge 120 and/or the south bridge 130. Since this is similar to the data transmission described in FIG. 2, a detailed description thereof is omitted. Thus, in FIG. 4, a data transmission through a direct path between the main memory 140 and SSD 150 is described in priority. For brevity of description, it is assumed that data stored in the main memory 140 is stored into the SSD 150.

In this case, the central processing unit 110 transmits a write signal to the SATA controller 131 of the south bridge 130 (A). The SATA controller 131 transmits the received data to the SSD 150 (B) and the SSD 150 receives data stored in the main memory 140 through the direct path (C). The SSD 150 stores the received data in its internal nonvolatile memory.

The second DMA 152 of the SSD 150 reads out data write-requested through the direct path and an address and size information corresponding to the data from the main memory 140. On the basis of the information read out from the main memory 140, the second DMA 152 stores the write-requested data in the internal nonvolatile memory of the SSD 150. After data is sequentially stored in the internal cache buffer of the SSD 150, the accumulated data may be stored in the nonvolatile memory of the SSD 150. The data may be directly stored in the nonvolatile memory of the SSD 150 via the internal cache buffer of the SSD 150.

As described above, a data transmission of the user system of FIG. 3 can be performed without passing through the north bridge 120 and the south bridge 130. Thus, a data transmission of the user system of FIG. 3 can be performed faster than that of the user system of FIG. 1.

The aforementioned description is only an illustration. The main memory controller 121 of the north bridge 120 may further include DMA. In this case, the DMA supports a data transmission via the north bridge 120 between the main memory 140 and the SSD 150. That is, the DMA is included in the north bridge 120, so that a multi tasking operation of the user system can be more smoothly performed.

Figure 5:
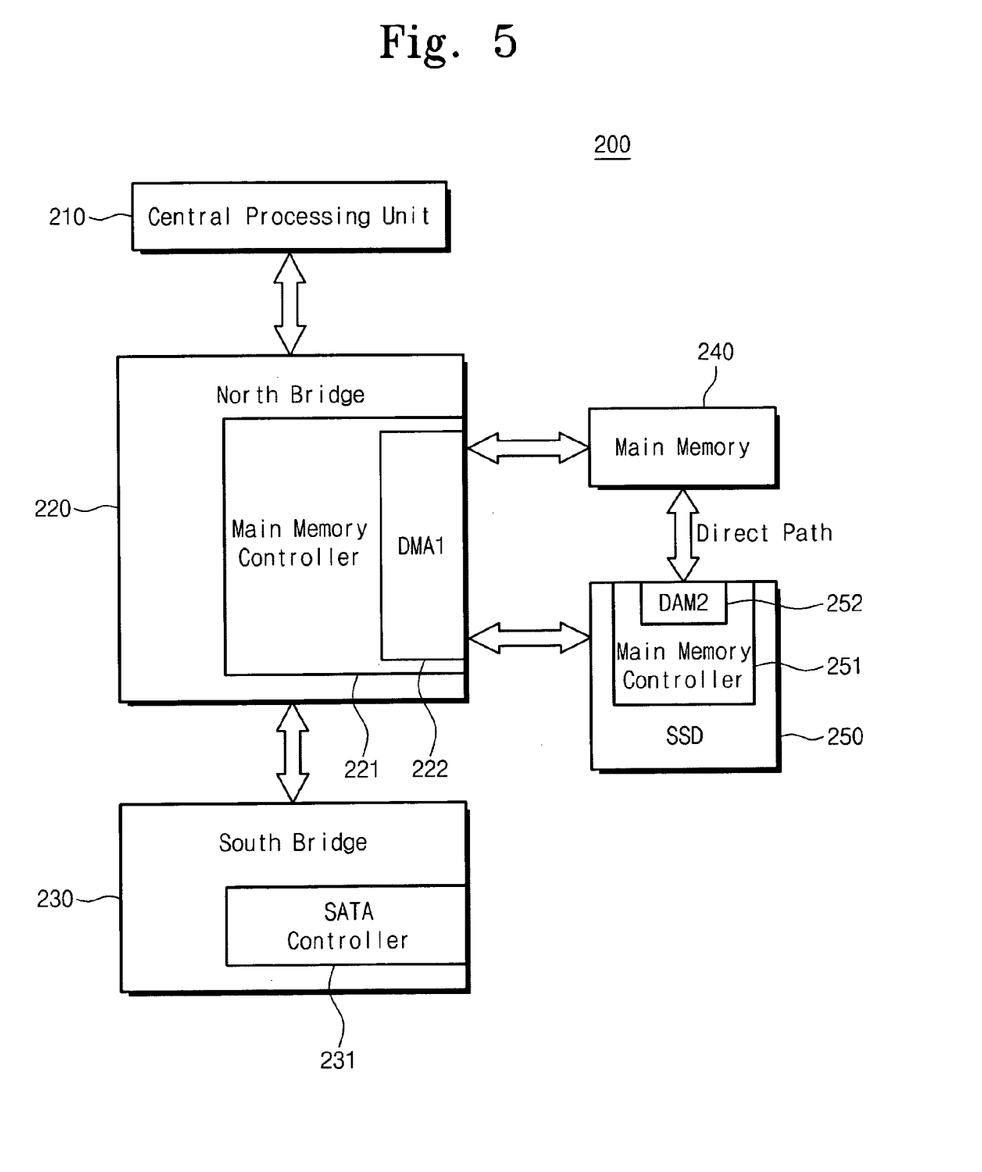
FIG. 5 is a block diagram illustrating a user system in accordance with some other embodiments of the inventive concept.

FIG. 5 is a block diagram illustrating a user system in accordance with some other embodiments of the inventive concept. In FIG. 5, as the user system 200, a PC system is illustrated. The user system 200 of FIG. 5 is similar to the user system of FIG. 1. A difference between the user systems of FIGS. 1 and 5 will be described in priority below.

Referring to FIG. 5, the user system 200 includes a central processing unit 210, a north bridge 220, a south bridge 230, a main memory 240 and a SSD 250.

Unlike the north bridge of FIG. 1, the main memory 240 and the SSD 250 are connected to the north bridge 220 of FIG. 5. In the user system 200 of FIG. 5, the north bridge 220 is connected to the main memory 240 and the SSD 250 to form a data transmission path while in the user system of FIG. 1, the north bridge is connected to the main memory to form a data transmission path and the south bridge is connected to the SSD to form a data transmission path. In this case, a data transmission may be performed via the north bridge 220. To achieve this, the north bridge 220 includes first DMA 222 for supporting a data transmission between the main memory 240 and the SSD 250.

Unlike the SSD of FIG. 1, the SSD 250 of FIG. 5 is connected to the main memory 240 to form a data transmission. That is, a direct path is formed between the main memory 240 and the SSD 250. In this case, a data transmission can be directly performed through the direct path between the main memory 240 and the SSD 250. The SSD 250 includes a main memory controller 251 for controlling the main memory 240 and a second DMA 252 for supporting a data transmission through the direct path.

As described above, unlike the user system of FIG. 1, in the user system 200 of FIG. 5, a direct data transmission can be performed between the main memory 240 and the SSD 250. Since a data transmission between the main memory 240 and the SSD 250 can be performed without passing through the north bridge 220 and the south bridge 230, a data transmission of the user system of FIG. 5 can be performed faster than that of the user system of FIG. 1.

A physical distance between the main memory 240 and the SSD 250 of the user system 200 of FIG. 5 is shorter than that of the user system of FIG. 1. Thus, even in the case that a data transmission is performed via the north bridge 220, a data transmission of the user system of FIG. 5 can be performed faster than that of the user system of FIG. 1.

In FIG. 5, the SSD 250 is connected to the north bridge 220 to use the same interface as the main memory 240. If the main memory 240 is a DRAM, a DRAM interface is applied to the SSD 250, too. Using a method of extending an operation of a data strobe pin of DRAM interface, the same DRAM interface can be applied to the DRAM and the SSD that have different speeds from each other.

Figure 6:
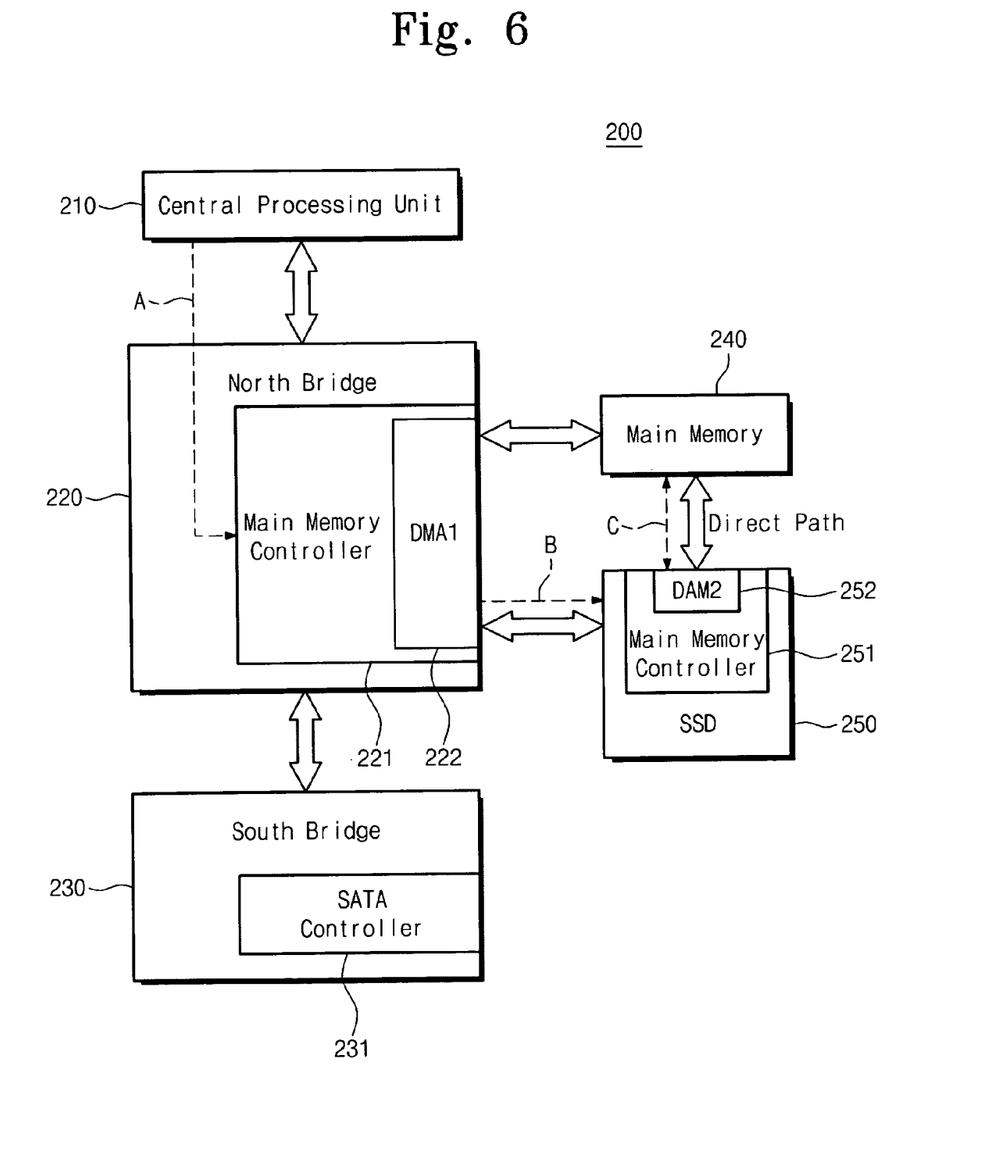
FIG. 6 is a block diagram for explaining a data transmission between a main memory and a SSD in the user system of FIG. 5.

FIG. 6 is a block diagram for explaining a data transmission between a main memory and a SSD in the user system of FIG. 5. For brevity of description, it is assumed that data stored in the main memory 240 is stored in the SSD 250.

In the case that a data transmission is performed through the direct path, the central processing unit 210 transmits a write signal to a main memory controller 221 of the north bridge 220 (A). The main memory controller 221 transmits the received write signal to the SSD 250 (B). After that, the SSD 250 receives data stored in the main memory 240 through the direct path (C). That is, a data transmission between the SSD 250 and the main memory 240 is performed through the direct path. The SSD 250 stores the received data in its internal nonvolatile memory.

The second DMA 252 of the SSD 250 reads out data write-requested through the direct path and an address and size information corresponding to the data from the main memory 240. The second DMA 252 stores the write-requested data read in the internal nonvolatile memory of the SSD 250. After data is sequentially stored in an internal cache buffer of the SSD 250, the accumulated data may be stored in the nonvolatile memory of the SSD 250. The data may be directly stored in the nonvolatile memory of the SSD 250 via the internal cache buffer of the SSD 250.

In the case that a data transmission is performed through the north bridge 220, the central processing unit 210 transmits a write signal to the main memory controller 221 of the north bridge 220. The main memory controller 221 receives information about an address and a size of write-requested data from the main memory 240 in response to the received write signal. The first DMA 222 reads out the write-requested data from the main memory 240 on the basis of the information received to the main memory controller 221. The first DMA 222 transmits the data read out from the main memory 240 to the SSD 250 and the SSD 250 stores the received data in its internal nonvolatile memory. Just like the user system of FIG. 3, the user system 200 of FIG. 5 can support a multi tasking operation.

The aforementioned description may be understood as an illustration. For example, the volatile memory performing a role of the cache buffer in the SSDs illustrated in FIGS. 3 through 6 may use a small capacity or may be removed. This is because the main memory and the SSD are located close to each other and have a data transmission path through the direct path. An operation performed in the internal volatile memory of the SSD can be replaced so that it can be performed in the main memory which is a volatile memory.

When an operating system (OS) accesses to the main memory and the SSD illustrated in FIGS. 3 through 6, the main memory and the SSD are recognized as one memory hierarchy. Namely, when an operation system (OS) accesses to the user system illustrated in FIGS. 3 through 6 the main memory and the SSD are recognized as one memory hierarchy. However, in the case that an operating system (OS) accesses to the user system illustrated in FIG. 1 a delay by a data transmission path between the main memory and the SSD is considered. This is because a physical distance between the main memory and the SSD illustrated in FIGS. 3 through 6 is short and a data transmission path through a direct path is formed between the main memory and the SSD illustrated in FIGS. 3 through 6.

Even in the case that the internal volatile memory of the SSD is replaced with the main memory, the operating system (OS) may recognize the main memory and the SSD as one memory hierarchy.

Figure 7:
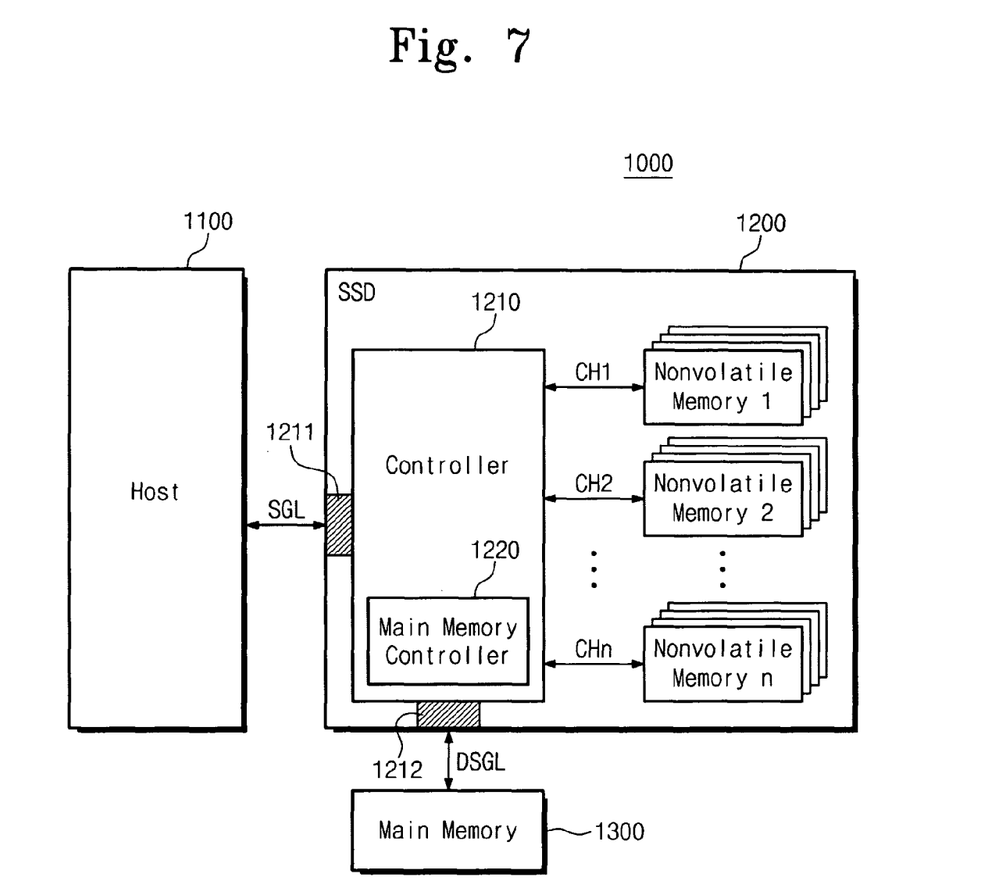
FIG. 7 is a block diagram illustrating a SSD in accordance with some embodiments of the inventive concept.

FIG. 7 is a block diagram illustrating a SSD in accordance with some embodiments of the inventive concept. The SSD illustrated in FIGS. 3 through 6 may be used as the SSD 1200 of FIG. 7. Referring to FIG. 7, the SSD system 1000 includes the SSD 1200 that communicates with a host 1100. The SSD 1200 exchanges a signal with the host 1100 through a host signal connector 1216. The SSD 1200 exchanges a signal with a main memory 1300 through a memory signal connector 1217. The SSD 1200 includes a plurality of nonvolatile memory devices 1201-120$n$, a SSD controller 1210 and a main memory controller 1220. For example, the main memory controller 1220 is included in the SSD controller 1210.

The plurality of nonvolatile memory devices 1201-120$n$ are used as a storage medium of the SSD 1200. The plurality of nonvolatile memory devices 1201-120$n$ may be embodied by a flash memory device having a mass storage device. The SSD 1200 mainly uses a flash memory but besides a flash memory device, a nonvolatile memory device such as a PRAM, a MRAM, a ReRAM, a FRAM, etc. may be used as the SSD 1200.

The plurality of nonvolatile memory devices 1201-120$n$ may be connected to the SSD controller 1210 through a plurality of channels CH1~CHn. One or more memory devices may be connected to one channel. Memory devices connected to one channel may be connected to the same data bus.

The SSD controller 1210 exchanges a signal SGL with the host 1100 through the host signal connector 1216. The main memory controller 1220 exchanges a signal DSGL with the main memory 1300 through the memory signal connector 1217. The signal SGL or DSGL may include a command, an address and data. An internal constitution of the SSD controller 1210 is described in detail with reference to FIG. 8.

Figure 8:
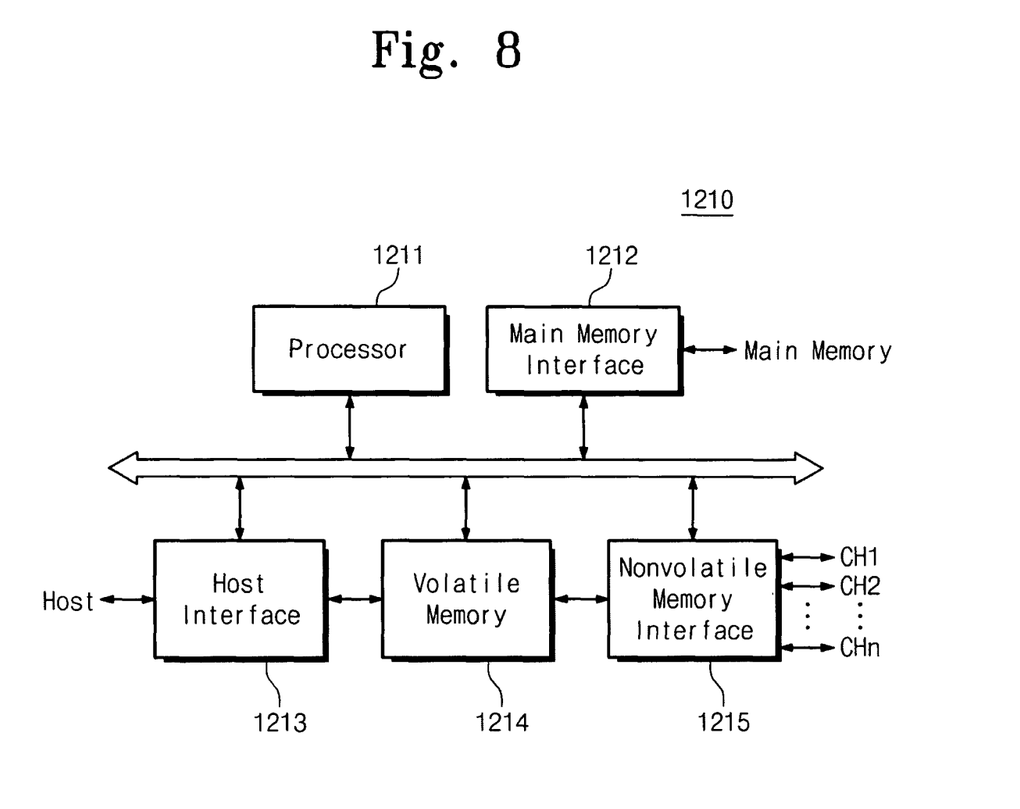
FIG. 8 is a block diagram illustrating a constitution of a SSD controller illustrated in FIG. 7.

FIG. 8 is a block diagram illustrating a constitution of a SSD controller illustrated in FIG. 7. Referring to FIG. 8, the SSD controller 1210 includes a processor 1211, a main memory interface 1212, a host interface 1213, a volatile memory 1214 and a nonvolatile memory interface 1215.

The processor 1211 analyses and processes a signal SGL received from the host 1100. The processor 1211 controls the host 1100 or the nonvolatile memories 1201~120$n$ through a host interface 1213 or a nonvolatile memory interface 1215. The processor 1211 controls operations of the nonvolatile memories 1201~120n according to a firmware for driving the SSD 1200.

The host interface 1213 provides an interfacing with the SSD 1200 in response to a protocol of the host 1100. The host interface 1213 can communicate with the host 1100 using a universal serial bus (USB), a small computer system interface (SCSI), a PCI express, an ATA, a parallel ATA (PATA), a serial ATA (SATA), a serial attached SCSI (SAS), etc. The host interface 1213 can perform a function of disk emulation supporting so that the host 1100 recognizes the SSD 1200 as a hard disk drive (HDD).

The main memory interface 1212 provides an interfacing with the SSD 1200 in response to a protocol of the main memory 1300. When the main memory 1300 is a DRAM, the main memory interface 1212 can communicate with the main memory 1300 using a DRAM interface. The main memory interface 1212 can communicate with the main memory 1300 using using a universal serial bus (USB), a small computer system interface (SCSI), a PCI express, an ATA, a parallel ATA (PATA), a serial ATA (SATA), a serial attached SCSI (SAS), etc.

The volatile memory 1214 temporarily stores write data provided from the host 1100 or data read from a nonvolatile memory device. The volatile memory 1214 can store meta data or cache data to be stored in the nonvolatile memories 1201~120n. When a sudden power off operation is performed, meta data or cache data stored in the volatile memory 1214 is stored in the nonvolatile memories 1201~120n. The volatile memory 1214 may include a DRAM, a SRAM, etc.

The nonvolatile memory interface 1215 scatters data received from the volatile memory 1214 over each of the channels CH1~CHn. The nonvolatile memory interface 1215 transmits data read from the nonvolatile memory device 1201~120n to the volatile memory 1214. The nonvolatile memory interface 1215 can use an interface method of NAND flash memory. That is, the SSD controller 1210 can perform a program, read or erase operation according to the interface method of NAND flash memory.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein

What is claimed is:

1. A user system comprising:
    a main memory for storing data processed by a central processing unit;
    a solid state disk for storing selected data among data stored in the main memory, the main memory and the solid state disk forming a single memory hierarchy, the main memory connected to the solid state disk to form a direct data transmission path;
    a north bridge connected to the main memory to form a first data transmission path; and
    a south bridge connected to the north bridge and the solid state disk to form a second data transmission path,
    wherein the direct data transmission path does not pass through the north bridge and the south bridge.

2. The user system of claim 1, wherein the solid state disk comprises a direct memory access (DMA) device for supporting a data transmission between the main memory and the solid state disk through the direct data transmission path.

3. The user system of claim 1, further comprising:
    a first DMA (direct memory access) device for supporting a data transmission between the main memory and the solid state disk through the direct data transmission path; and
    a second DMA (direct memory access) device for supporting a data transmission between the main memory and the solid state disk via the north bridge.

4. The user system of claim 3, wherein the first DMA (direct memory access) device is in the solid state disk and the second DMA (direct memory access) device is in the south bridge.

5. A user system comprising:
    a main memory for storing data processed by a central processing unit;
    a solid state disk for storing selected data among data stored in the main memory, wherein
        the main memory and the solid state disk form a single memory hierarchy,
        the main memory is connected to the solid state disk to form a direct data transmission path, and
        the main memory and the solid state disk are connected to a north bridge to form a data transmission path;
    a first DMA (direct memory access) device for supporting a data transmission between the main memory and the solid state disk through the direct data transmission path; and
    a second DMA (direct memory access) device for supporting a data transmission between the main memory and the solid state disk via the north bridge.

6. The user system of claim 5, wherein the first DMA (direct memory access) is in the solid state disk and the second DMA (direct memory access) is in the north bridge.

7. A user system comprising:
    a first memory area storing data processed by a control of a central processing unit;
    a second memory area storing selected data among data stored in the first memory area, the second memory area being a nonvolatile memory; and
    a bridge area connected to the first and second memory areas to form a first data transmission path and a second data transmission path, respectively, wherein
    the first and second memory areas form a single memory hierarchy,
    a direct data transmission path is formed between the first memory area and the second memory area, and
    the bridge area includes,
        a first bridge connected to the first memory area to form the first data transmission path, and
        a second bridge connected to the first bridge and the second memory area to form the second data transmission path,
        wherein the direct data transmission path does not pass through the first and second bridges.

8. The user system of claim 7, wherein the second memory area comprises a first DMA (direct memory access) device for supporting a data transmission between the first memory area and the second memory area through the direct transmission path, and the second bridge comprises a second DMA (direct memory access) device for supporting a data transmission between the first memory area and the second memory area through the second data transmission path via the first and second bridges.

9. A user system of comprising:
a first memo area storing data processed by a control of a central processing unit;
a second memory area storing selected data among data stored in the first memory area, the second memory area being a nonvolatile memory; and
a bridge area connected to the first and second memory areas to form a data transmission path, wherein
the first and second memory areas form a single memory hierarchy,
a direct data transmission path is formed between the first memory area and the second memory area, and
the bridge area is connected to the first memory area and the second memory area and wherein the first memory area and the second memory area communicate with the bridge area using the same interface.

10. The user system of claim 9, wherein the second memory area comprises a first DMA (direct memory access) device for supporting a data transmission between the first memory area and the second memory area through the direct transmission path and wherein the bridge area comprises a second DMA (direct memory access) device for supporting a data transmission between the first memory area and the second memory area through the data transmission path via the bridge area.

* * * * *